US011734348B2

(12) United States Patent
Trim et al.

(10) Patent No.: US 11,734,348 B2
(45) Date of Patent: Aug. 22, 2023

(54) INTELLIGENT AUDIO COMPOSITION GUIDANCE

(71) Applicant: INTERNATIONAL BUSINESS MACHINES CORPORATION, Armonk, NY (US)

(72) Inventors: Craig M. Trim, Ventura, CA (US); Gandhi Sivakumar, Bentleigh (AU); Martin G. Keen, Cary, NC (US); Hernan A. Cunico, Holly Springs, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 16/136,788

(22) Filed: Sep. 20, 2018

(65) Prior Publication Data

US 2020/0097502 A1 Mar. 26, 2020

(51) Int. Cl.
G06F 15/16 (2006.01)
G06F 16/783 (2019.01)
H04N 5/265 (2006.01)
G06F 16/2457 (2019.01)
G10L 15/18 (2013.01)
G10L 15/26 (2006.01)
G06V 20/40 (2022.01)

(52) U.S. Cl.
CPC .... *G06F 16/7834* (2019.01); *G06F 16/24578* (2019.01); *G06V 20/41* (2022.01); *G10L 15/18* (2013.01); *G10L 15/26* (2013.01); *H04N 5/265* (2013.01)

(58) Field of Classification Search
CPC ......... G06F 16/7834; G06F 16/24578; H04N 5/265; G10L 15/18; G10L 15/265; G10L 25/57; G10L 15/1822; G10L 15/26; G10L 25/54; G06K 9/00718; G11B 27/00
See application file for complete search history.

(56) References Cited

U.S. PATENT DOCUMENTS

| 6,084,169 | A | * | 7/2000 | Hasegawa | ............ G10H 1/0025 84/DIG. 12 |
| 6,445,822 | B1 | * | 9/2002 | Crill | ...................... G06F 16/583 382/218 |
| 8,463,640 | B2 | | 6/2013 | Jang et al. | |
| 9,148,619 | B2 | | 9/2015 | Izo et al. | |
| 10,061,815 | B1 | * | 8/2018 | Coyle | ..................... G06F 16/93 |
| 2006/0161587 | A1 | * | 7/2006 | Woo | ...................... G06F 16/685 |
| 2019/0197369 | A1 | * | 6/2019 | Law | ...................... G06K 9/0063 |

OTHER PUBLICATIONS

Flickner et al. Query by image and video content: The QBIC system. IEEE Computer 28.9 (1995): 23-32. (Year: 1995).*

(Continued)

*Primary Examiner* — Alex Gofman
*Assistant Examiner* — Shelly X Qian
(74) *Attorney, Agent, or Firm* — Griffiths & Seaton PLLC

(57) ABSTRACT

Embodiments for implementing intelligent audio composition guidance for a video by a processor. One or more acoustic characteristics used in a plurality of video segments may be identified, from a corpus, as having similar acoustic, linguistic, and visual characteristics of a selected video segment.

12 Claims, 7 Drawing Sheets

(56) References Cited

OTHER PUBLICATIONS

Morales et al. OpenMM: Open-source Multimodal Feature Extraction Tool. INTERSPEECH 2017, pp. 3354-3358. (Year: 2017).*
Bolle, et al. Video query: Research directions. IBM Journal Research Development, 42:2, 1998. (Year: 1998).*
Media compositions and editing. https://docs.microsoft.com/en-us/windows/uwp/audio-video-camera/media-compositions-and-editing, 2017, pp. 1-13. (Year: 2017).*
Eyben, et al. Recent Developments in openSMILE, the Munich Open-Source Multimedia Feature Extractor. MM'13, pp. 835-838. (Year: 2013).*
Deng et al. An Overview of Event Extraction from Twitter. 2015 International Conference on Cyber-Enabled Distributed Computing and Knowledge Discovery, pp. 251-256. (Year: 2015).*
Deng et al. Music Emotion Retrieval Based on Acoustic Features. Advances in Electric and Electronics, LNEE 155, 2012. pp. 169-177. (Year: 2012).*
Shani et al. Displaying Relevance Scores for Search Results. SIGIR'13, pp. 901-904. (Year: 2013).*

* cited by examiner

US 11,734,348 B2

INTELLIGENT AUDIO COMPOSITION GUIDANCE

BACKGROUND OF THE INVENTION

Field of the Invention

The present invention relates in general to computing systems, and more particularly to, various embodiments for implementing intelligent audio composition guidance for a video using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for implementing intelligent audio composition guidance for a video by a processor, are provided. In one embodiment, by way of example only, a method for implementing intelligent audio composition guidance for a video, again by a processor, is provided. One or more acoustic characteristics used in a plurality of video segments may be identified as having similar acoustic, linguistic, and visual characteristics of a selected video segment.

In an additional aspect, a video segment is analyzed to derive acoustic, linguistic, and visual characteristics. The acoustic, linguistic, and visual characteristics may be stored in a repository. A script and/or video segment may be used as input to create search parameters in a search query. A video composition corpus may be analyzed for video segments with matching acoustic, linguistic, and visual characteristics. Acoustic characteristics of matching video segments may be aggregated and provided to a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
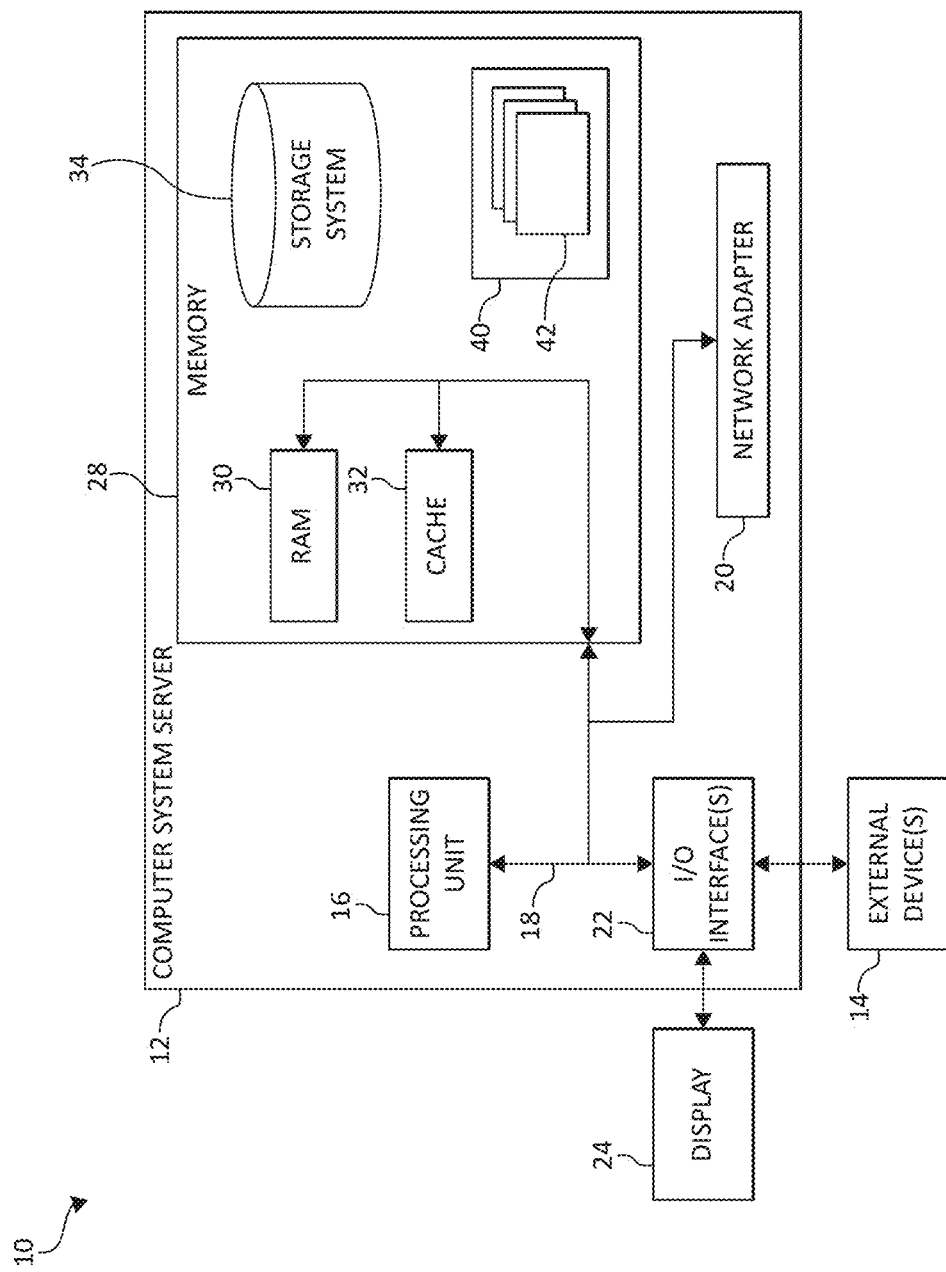
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Such IoT computing systems may be employed in a variety of settings, such as within the entertainment industry.

As the amount of electronic information continues to increase, the demand for sophisticated information access systems also grows. Digital or "online" data has become increasingly accessible through real-time, global computer networks. The data may reflect many aspects of the behavior of groups or individuals in a population, including entertainment industries. Many data-intensive applications require the identification and extraction of information from data sources, such as, for example, within the entertainment industry.

For example, selection of audio composition data (e.g., background music, sound effects, and so forth) is an important part in creating engaging video content. The audio composition used in other video content can provide a useful guide as to what works and what does not. For example, consider the following scenarios. 1) A music composer wishes to create a musical score for a given movie scene. The scene is intended to portray a shipwreck in a thunderstorm and is intended to evoke memories of movies from the late 1980's. 2) A video producer wishes to select a musical track to use as background music for a business presentation (e.g., an address to senior executive(s)). The video should evoke association with other high profile executive videos. 3) A video creator is recording a hands-on demonstration and would like to mimic the audio design of successful hands-on videos addressing similar topics from other creators. In each of these scenarios, a need exists for deriving the prevailing acoustic properties of video segments that match the acoustic, linguistic, and visual characteristics of a video segment or script that a user is creating.

Thus, the present invention provides a cognitive system that creates a corpus of video segments (e.g., a corpus of movie segments, sporting/outdoor videos, training/corporate videos, hands-on demonstration videos, etc.) describing their acoustic, linguistic, and visual characteristics. The corpus may be queried by a user to find/identify the acoustic characteristics used in other video segments that share the same, similar, and/or matching characteristics with the acoustic characteristics of the video segment the user is creating. For example, a music composer can learn the most common acoustic properties that other videos have used in shipwreck/thunderstorm videos from the late 1980's. The music composer may then compose their own composition mimicking these properties such as melody, harmony, rhythm, structure, texture, tempo, timbre, dynamics, mix, and emotional state. As an additional example, the present invention enables a video producer to search the corpus (e.g., which may include a library of music) to find/identify background music with similar characteristics as other training videos that may be provided to customers, clients, and/or top-level executives of a company, including genre, movement, and mood. Also, the present invention enables a video creator to mimic the audio design of other successful "hands-on demonstration videos" to utilize similar sound effects and background music.

Thus, various embodiments provide for a cognitive system that provides for visual composition analysis (e.g., acoustic, linguistic, and visual analysis) of a given video segment to derive its acoustic, linguistic, and visual characteristics. A selected video segment and/or script may be used to derive the most common or predominant acoustic characteristics used in other video segments that share similar characteristics with the input data (e.g., the selected video segment and/or script) and such video segments having the optional hierarchy segment. The optional hierarch segment refers to characteristics of a video segment beyond its physical characteristics such as, for example, which regions was the video segment released in, what age restrictions was the video segment assigned, etc.

In an additional aspect, the present invention may analyze a video segment to derive acoustic, linguistic, and visual characteristics. The acoustic, linguistic, and visual characteristics may be stored in a repository. A script and/or video segment may be used as input to create search parameters in a search query. A video composition corpus may be analyzed for video segments with matching acoustic, linguistic, and visual characteristics. Acoustic characteristics of matching video segments may be aggregated and provided to a user. A user may be presented with the search results (e.g., acoustic characteristics of matching video segments) via a graphical user interface ("GUI") to enable the user to further interact with the output.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
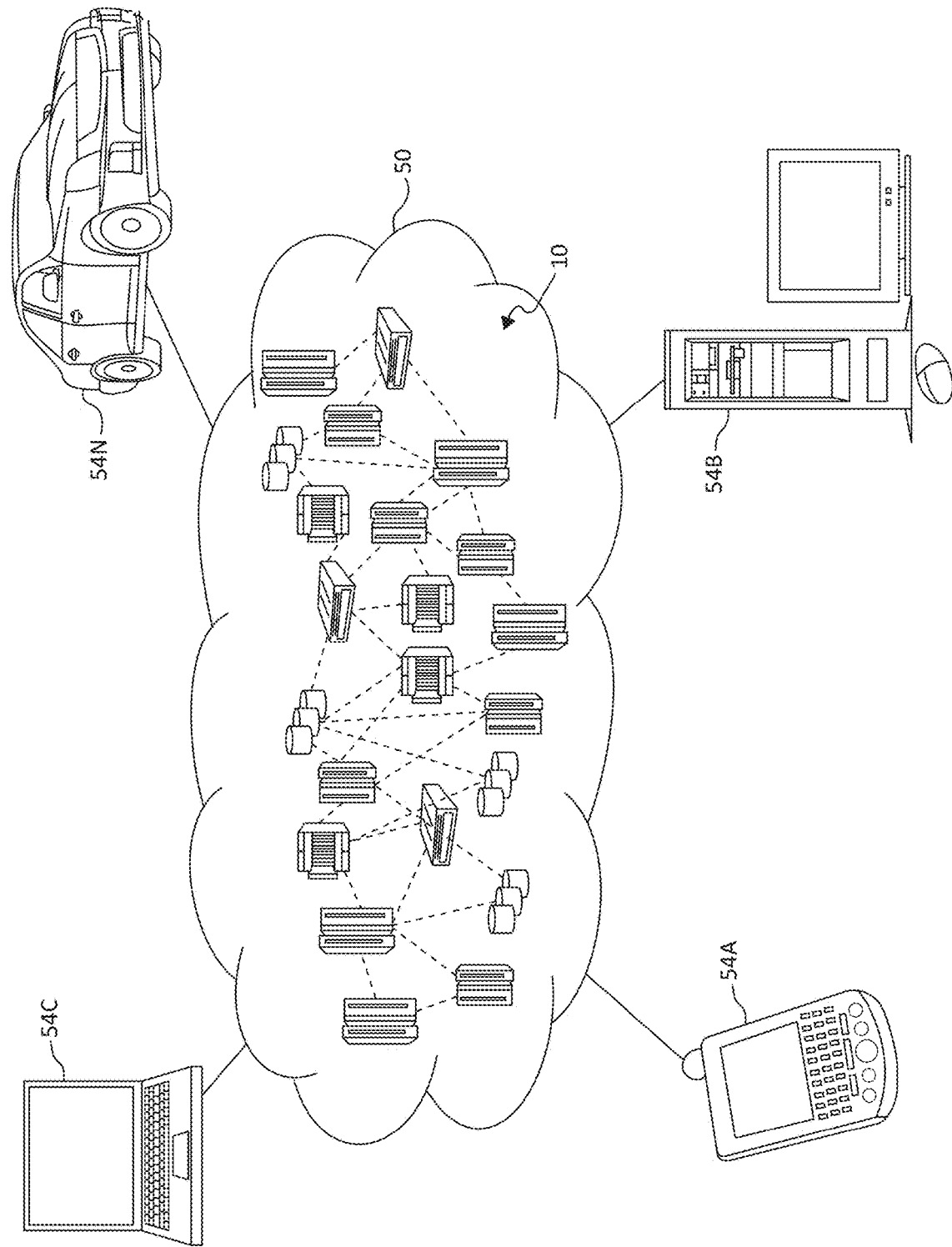
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
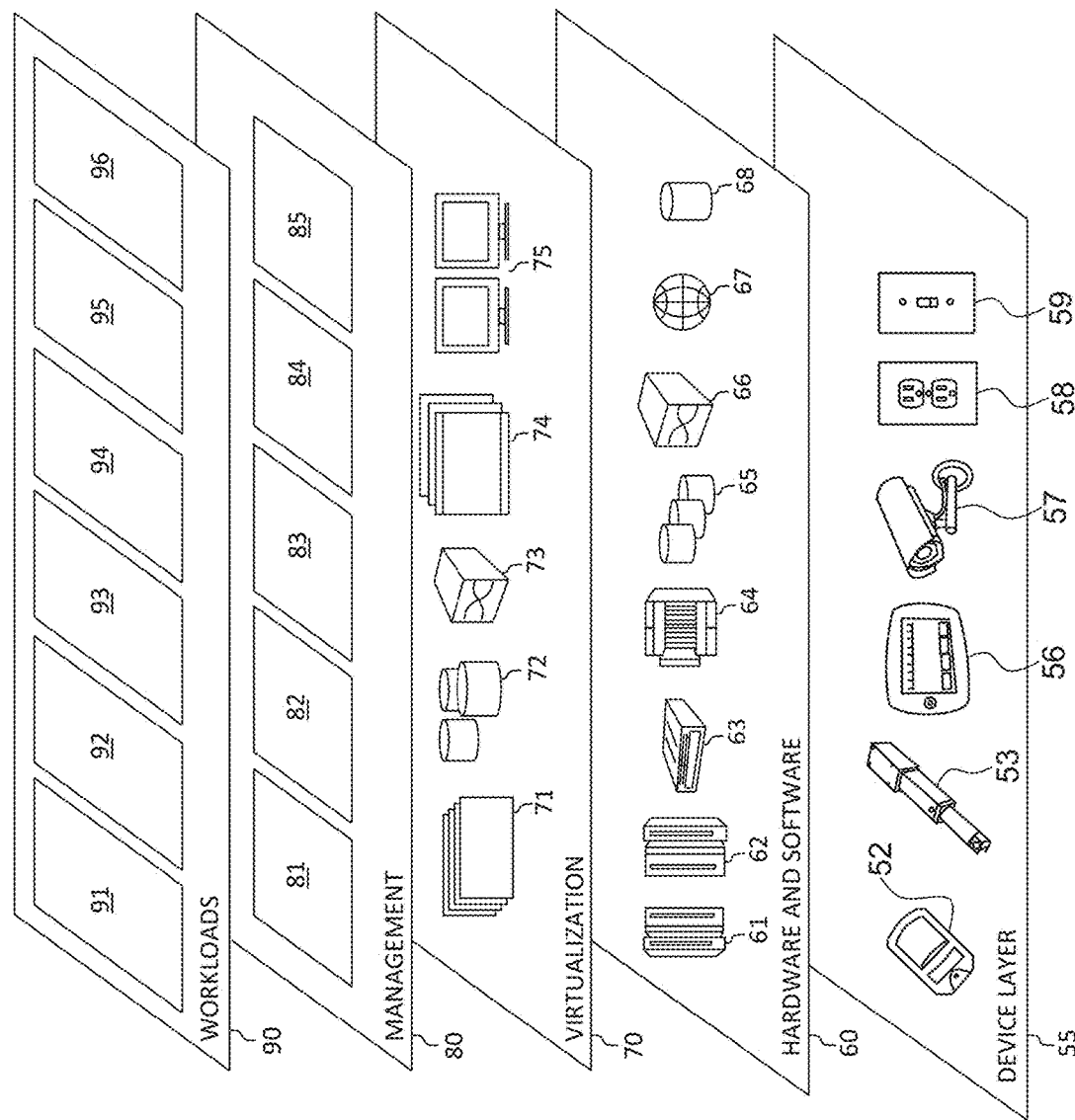
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent audio composition guidance workloads and functions 96. In addition, intelligent audio composition guidance workloads and functions 96 may include such operations as data analysis (including data collection and processing from various environmental sensors), and predictive data analytics functions. One of ordinary skill in the art will appreciate that the intelligent audio composition guidance workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
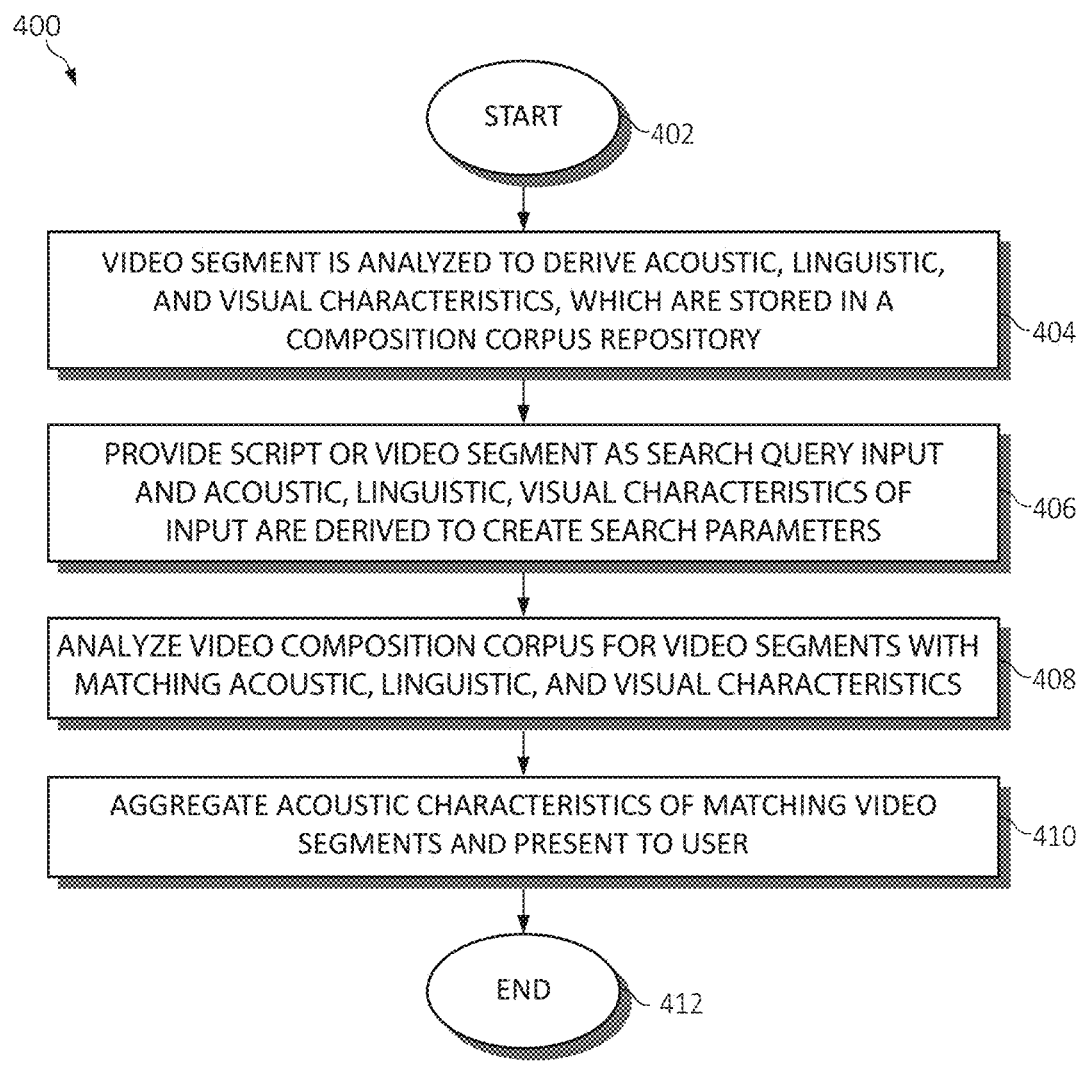
FIG. 4 is a flowchart diagram depicting an exemplary method for implementing intelligent audio composition guidance for a video in which aspects of the present invention may be realized.

Turning now to FIG. 4, a method 400 for implementing intelligent audio composition guidance for a video by a processor is depicted, in which various aspects of the illustrated embodiments may be implemented. That is, FIG. 4 is a flowchart of an example method 400 for implementing intelligent audio composition guidance for a video in a computing environment according to an example of the present invention. The functionality 700 may be implemented as a method executed as instructions on a machine, where the instructions are included on at least one computer readable medium or one non-transitory machine-readable storage medium. The functionality 400 may start in block 402.

A video segment may be analyzed to derive acoustic, linguistic, and visual characteristics, which are stored in a composition corpus repository, as in block 404. A script or video segment is provided as search query input and the acoustic, linguistic, and visual characteristics of a script and/or video segment of the input (e.g., the script and/or video segment) may be derived to create search parameters (for the search query), as in block 406. That is, the user provides a script or video, and the script or video is analyzed to derive the properties of the script or video, and those derived properties become the search criteria. A video composition corpus may be analyzed for video segments with matching acoustic, linguistic, and visual characteristics, as in block 408. Acoustic characteristics of the matching video segments may be aggregated and presented to a user, as in block 410. The functionality 400 may end in block 406.

Figure 5A:
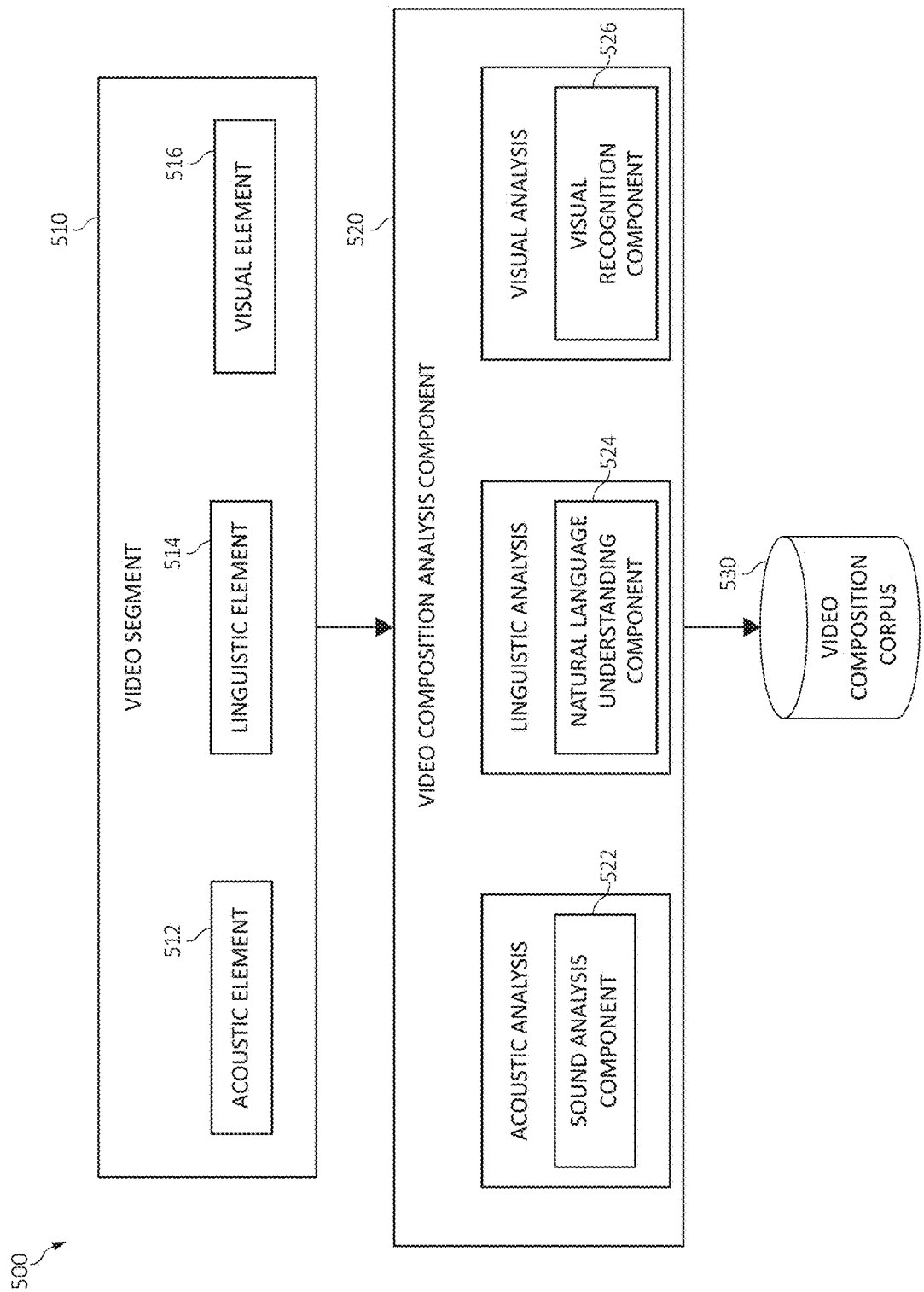
FIG. 5A is an additional block diagram depicting analyzing video segments to derive video composition properties which aspects of the present invention may be realized.

FIG. 5A illustrates a cognitive system 500 for analyzing video segments to derive video composition properties and searching a script or video segments to derive acoustic, linguistic, and visual characteristics in an IoT computing environment. As will be seen, many of the functional blocks may also be considered "modules" or "components" of functionality, in the same descriptive sense as has been previously described in FIGS. 1-4. With the foregoing in mind, the module/component blocks of the cognitive system 500 may also be incorporated into various hardware and software components of a system for analyzing video segments in accordance with the present invention. Many of the functional blocks of the cognitive system 500 may execute as background processes on various components, either in distributed computing components, or on the user device, or elsewhere.

The cognitive system 500 may include a video composition analysis component 520, which may incorporate processing unit 16 ("processors) and memory 28 of FIG. 1 (not shown for illustrative convenience) to perform various computational, data processing and other functionality in accordance with various aspects of the present invention. The video composition analysis component 520 may be provided by the computer system/server 12 of FIG. 1. As one of ordinary skill in the art will appreciate, the depiction of the various functional units in the video composition analysis component 520 is for purposes of illustration, as the functional units may be located within the video composition analysis component 520 or elsewhere within and/or between distributed computing components. In one aspect, the video composition analysis component 520 may include a sound analysis component 522, a natural language processing ("NLP") component 524 (e.g., a natural language understanding component), and a visual recognition component 526.

As illustrated in FIG. 5A, a first stage ("stage 1") is illustrated for performing acoustic, linguistic, and visual analysis of video segments. As part of stage 1, a collection of video segment 510 may be analyzed by the video composition analysis component 520. Each of the video segment 510 may include all or portions of various videos such as, for example, movies, television programs, instructional videos, educational videos, sporting/outdoor/recreational videos, corporate/training videos, or any other video content with an audio composition. The video segment 510 may include acoustic elements 512, linguistic elements 514, and visual elements 516. The acoustic elements 512 may include elements relating to sound such as, for example, a sound track, background music, sound effects. The linguistic elements 514 may include elements relating to language such as, for example, a spoken dialog. The visual elements 516 may include elements relating to the visual content in the video segment.

In one aspect, the video composition analysis component 520 performs the following analysis on each of the components for a given video segment. The sound analysis component 522 may perform an acoustic analysis that analyzes the audio compositions of the video segment 510 to derive the characteristics/properties (e.g., acoustic, linguistic, and visual characteristics) such as, for example, a melody, harmony, rhythm, structure, texture, tempo, timbre, dynamics, mix, and emotional state.

The NLP component 524 may perform a linguistic analysis that analyzes verbal communications in the video segment 510 (e.g., what is being said in a given scene of a video). In one aspect, one or more artificial intelligence ("AI") or NLP instances may be provided such as, for example, Speech-To-Text operation to create a transcript of spoken content, and Natural Language Understanding to classify the topics, tone, and emotional state of the spoken content. In one aspect, the AI and NLP instances may include instances of IBM® Watson® such as Watson® Analytics. (IBM® and Watson® are trademarks of International Business Machines Corporation).

The visual recognition component 526 may perform a visual analysis that analyzes the visual portions of the video segment 510. The visual recognition component 526 may also classify the type of content being displayed in the video segment 510 (e.g., classify what is being shown in a video such as the objects that appear, the location, the participants, etc.). The output of the acoustic, linguistic, and visual analysis for a given video segment (e.g., video segment 510) may be stored in a video composition corpus 530 (e.g., a video composition corpus repository).

Figure 5B:
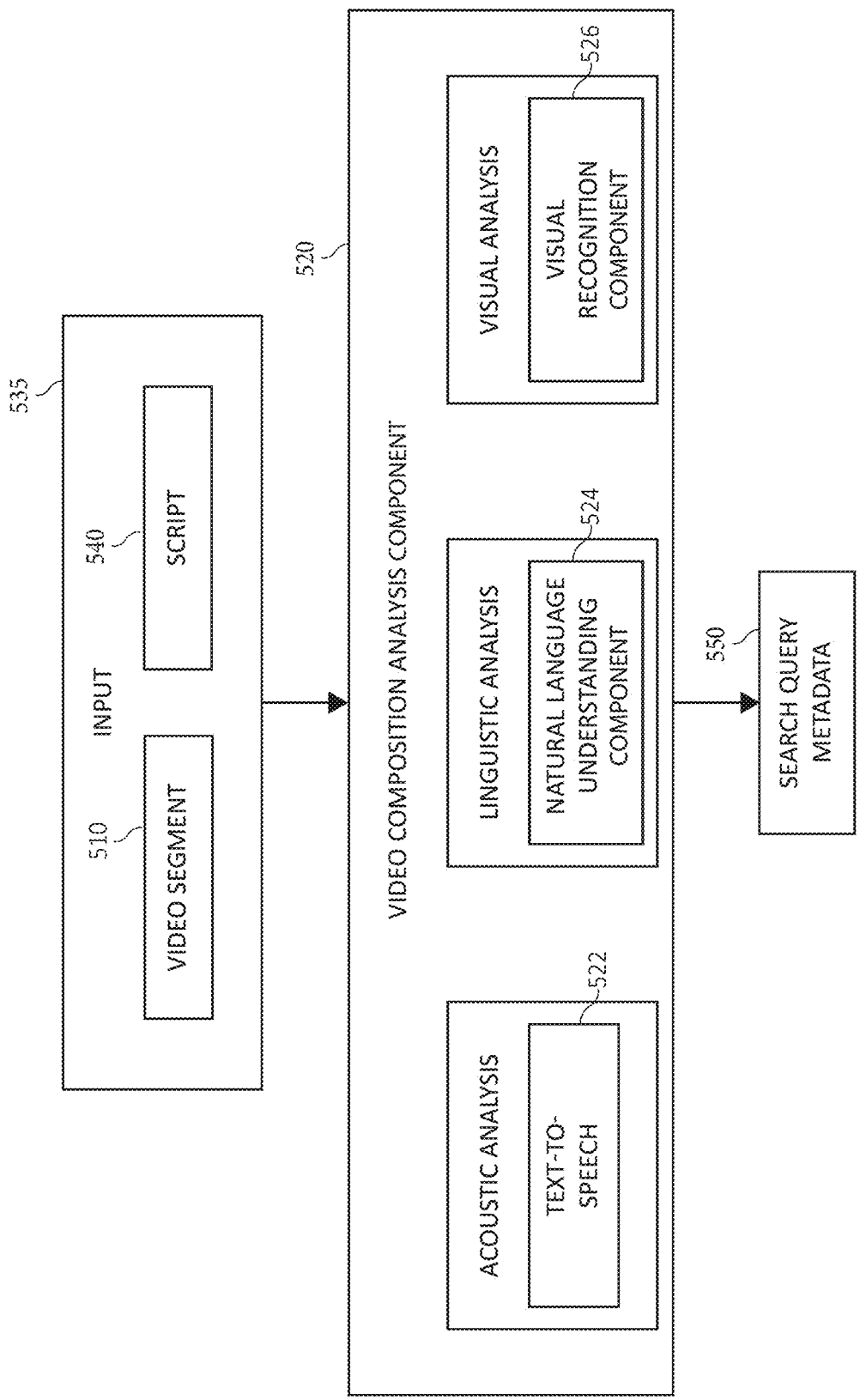
FIG. 5B is an additional block diagram depicting searching a script or video segments to derive acoustic, linguistic, and visual characteristics which aspects of the present invention may be realized.

Turning now to FIG. 5B, a second stage ("stage 2") is illustrated for receiving one or more video segments or scripts from a user to identify video segments sharing similar properties. As part of stage 2, a user may intend/desire to create a search query to find acoustic properties of one or more videos with similar/matching content in order to derive acoustic properties that videos having similar characteristics have used. In one aspect, a video segment 510 and/or a script 540 (collectively referred to in FIG. 5B as input 535) may be received by the video composition analysis 510 from a user (e.g., the video segment and/or script is provided as input 535 from a user to the video composition analysis component 520). The video segment 510 may include all or a portion of a video that requires an audio composition to be added such as, for example, a movie scene, an executive interview, a technical demonstration, or other video. The script 540 may include a written script of text data that may appear in a video such as, for example, a movie screen script, a transcript for a person assigned a talking role, and/or a list of topics to show in a technical demonstration.

The video composition analysis component 520 may use the acoustic, linguistic, and visual analysis operations as described in stage 1 of FIG. 5A to derive the characteristics of the input 535 (e.g., the video segment and/or script). The acoustic, linguistic, and visual analysis characteristics derived from the video composition analysis component 520 may be used to form search query metadata 550.

In a third stage ("stage 3"), the search query metadata 550 may be used as a search query to search a visual composition corpus. That is, the video composition corpus 530 may be analyzed to retrieve acoustic characteristics of one or more similar videos that match the search query parameters such as, for example, the acoustic, linguistic, and visual characteristics derived from the video composition analysis component 520 from stage 2. Said differently, the search query metadata from stage 2 is used to search and analyze the video composition corpus 530 for identifying and/or matching similar video segments that have related characteristics.

The similar and/or related acoustic, linguistic, and visual characteristics may include a combination of factors such as, for example, video segments addressing a similar topic, a similar setting, and/or representing a similar emotional state. The correlation between a selected video segment 510, and the script 540 provided as input (e.g., input 535), may be assigned a correlation score indicating a degree or level of how similar the characteristics match. Said differently, the correlation score may be assigned to each of the plurality of video segments (which may be included in the video composition corpus 530) according to a degree of similarity to the acoustic, linguistic, and visual characteristics of a selected video segment. The matching videos found in the video composition corpus 530 (e.g., video composition corpus repository) that exceed a given threshold for correlation score are retrieved from the video composition corpus 530. That is, one or more acoustic characteristics of those of the plurality of video segments, having a correlation score equal to or greater than a defined threshold, may be aggregated.

In a fourth stage ("stage 4"), a user may be presented with acoustic characteristics of matching video segments in response to the search query. The results/findings of the search query of stage 3 may be presented to a user (e.g., the aggregated acoustic characteristics of those of the plurality of video segments having a correlation score equal to or greater than a defined threshold). These findings relate to the predominant acoustic compositions of video segments that share similar characteristics to the input 535 (e.g., the video segment 510 and/or script 540).

In one aspect, the results of the search query may include aggregated acoustic compositions that describes an aggregate of the media data content (e.g., musical content) used in these matching videos including, for example, melody, harmony, rhythm, structure, texture, tempo, timbre, dynamics, mix, and emotional state. In an additional aspect, the results of the search query may include aggregated acoustic compositions that describes highly correlated video segments with a highest scored correlated videos that match the characteristics of the input 535 listed with their correlation score. That is, a highest scored correlated video segments being those video segments having the correlation score equal to or greater than a defined threshold. In one aspect, the scoring may be a defined value, a value within a range of values, a percentage, a value or percentage greater than, equal to, or less than a defined threshold, and/or other defined scoring process. In an additional aspect, where possible, the highest scored correlated video segments may be embedded into a report and/or an interactive GUI of an IoT device that a user can view segments of video that most closely match the characteristics of input to enable the user to sample and hear how acoustic compositions are used. The user can make use of these findings to search/identify similar acoustic compositions to use in the video the user desires to create such as, for example, searching a music repository (e.g., the video composition corpus 530). The user may then be enabled to create their own compositions utilizing the acoustic characteristics described in the results of the search query.

In one aspect, those results/findings of the search query of stage 3 may be presented to a user (e.g., the aggregated acoustic characteristics of those of the plurality of video segments having a correlation score equal to or greater than a defined threshold) and dynamically implemented into selected video data (e.g., a current project), which may be in a creating stage, an editing stage, and/or a filming stage. In this way, the video composition analysis component 520 may automatically implement one or more of the results/findings into the current project according to one or more parameters defined by the user. For example, the user may implement a melody, harmony, rhythm, structure, texture, tempo, timbre, dynamics, mix, and emotional state of a musical score identified in the search results into a selected video scene or segment. More specifically, the video composition analysis component 520 may implement one or more machine learning operation to learn one or more of the search results to train a machine learning model. A machine learning (ML) classifier may be trained using one or more of the search results (e.g., the aggregated acoustic characteristics) to assist with future intelligent audio composition guidance operations as described herein. The machine learning models may be used to learn and understand user preferences, habits, and/or likes/interests so as to assist with automatically implementing one or more of the results/findings into the current project. For example, the machine learning operation may learn one or more characteristics and properties of the search results along with the user preferences, styles, habits, and/or video/audio creation interests, and use an appropriate machine learning model to select, implement, and/or transform one or more acoustic characteristics into a new video segment/scene.

Figure 6:
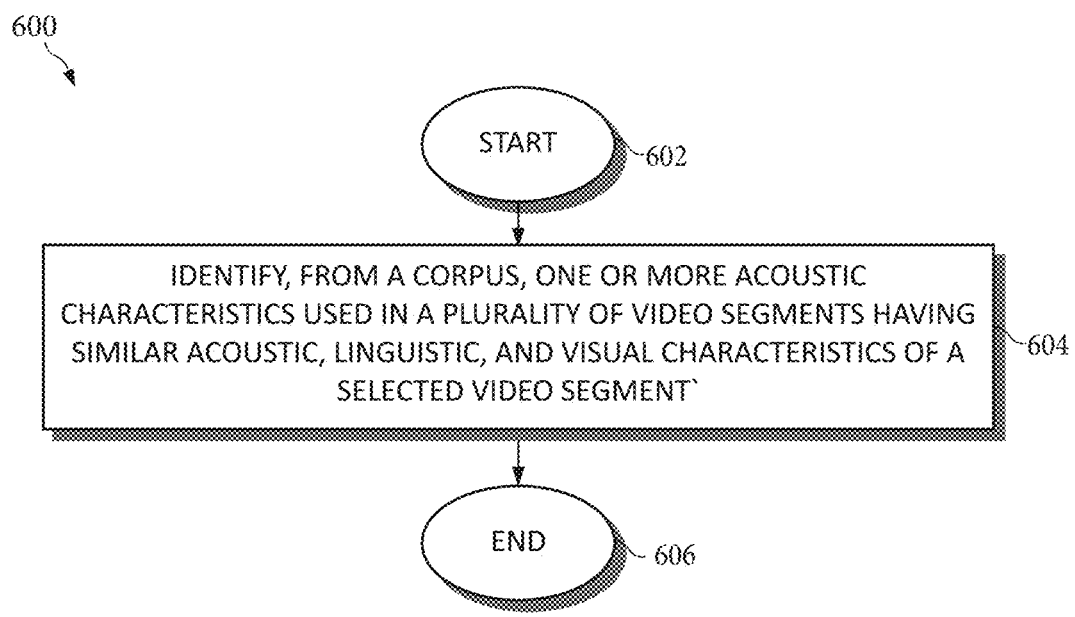
FIG. 6 is a flowchart diagram depicting an exemplary method for implementing intelligent audio composition guidance for a video; again in which aspects of the present invention may be realized.

Turning now to FIG. 6, a method 600 for implementing intelligent audio composition guidance for a video by a processor is depicted, in which various aspects of the illustrated embodiments may be implemented. That is, FIG. 6 is a flowchart of an additional example method 600 for implementing intelligent audio composition guidance for a video in a computing environment according to an example of the present invention. The functionality 700 may be implemented as a method executed as instructions on a machine, where the instructions are included on at least one computer readable medium or one non-transitory machine-readable storage medium. The functionality 600 may start in block 602.

One or more acoustic characteristics used in a plurality of video segments may be identified, from a corpus, as having similar acoustic, linguistic, and visual characteristics of a selected video segment, as in block 604. The functionality 600 may end in block 606.

In one aspect, in conjunction with and/or as part of at least one block of FIG. 6, the operation of 600 may include one or more of each of the following. The operation of 600 may analyze each of the plurality of video segments and derive acoustic, linguistic, and visual characteristics from the plurality of video segments. The corpus may be created (from a plurality of analyzed describing the acoustic, linguistic, and visual characteristics derived from each the plurality of video segments.

The operation of 600 may create a search query using the acoustic, linguistic, and visual characteristics from the selected video segment, a text document, or a combination thereof and perform the search query on a corpus describing the acoustic, linguistic, and visual characteristics derived from each of the plurality of video segments. A correlation score may be assigned to each of the plurality of video segments according to a degree of similarity to the acoustic, linguistic, and visual characteristics of the selected video segment. The operation of 600 may aggregate the one or more acoustic characteristics of those of the plurality of video segments having a correlation score equal to or greater than a defined threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for implementing intelligent audio composition guidance for a video in an Internet of Things (IoT) computing environment, comprising:
receiving, as input from a user through a user interface, a video associated with a current video project;
segmenting the video into video segments and identifying a selected video segment for which an audio composition is to be generated for;
inputting only the selected video segment of the video for which the audio composition is to be generated for into a search query;
analyzing the selected video segment to produce search query metadata;
generating, using a visual composition analysis of visual data of the selected video segment based on the search query metadata, the search query as a search for an audio analysis of audio data of alternative video segments stored in a corpus based on the visual composition analysis of the visual data;
responsive to receiving the selected video segment and the search query metadata as input into the search query, identifying, from the corpus, one or more acoustic characteristics used in the alternative video segments having similar acoustic, linguistic, and visual characteristics of the selected video segment according to a comparison of the selected video segment and the alternative video segments, wherein the similar acoustics, linguistic, and visual characteristics of the selected video segment are determined by performing an artificial intelligence (AI) analysis to derive a topic, tone, and emotional components related to a context of the selected video segment, including indications of characteristics associated with those of the alternative video segments used during a particular historical time period, used to match a similar context of the alternative video segments to identify the one or more acoustic characteristics related thereto notwithstanding whether the similar acoustic, linguistic, and visual characteristics of the selected video segment and the alternative video segments are identical;
assigning a correlation score to each of the alternative video segments according to a degree of similarity to the acoustic, linguistic, and visual characteristics of the selected video segment;
outputting an indication of the identified one or more acoustic characteristics determined from the comparison via the user interface selectively used in adding the audio composition to the selected video segment, wherein the indication is inclusive of a plurality of alternative audio compositions respectively used in the alternative video segments to which the identified one or more acoustic characteristics correspond;
in conjunction with outputting the indication, displaying those of the alternative video segments having the correlation score over a predefined threshold on an interactive graphical user interface (GUI) and listed with the correlation score, wherein the user selects through the plurality of the alternative video segments listed on the GUI to selectively view only those specific portions of the alternative video segments respectively associated with those of the plurality of alternative audio compositions identified by the search query; and
generating the audio composition for the selected video segment using the indicated identified one or more acoustic characteristics, wherein generating the audio composition includes automatically associating the identified one or more acoustic characteristics, output as a result of the search query, with the selected video segment such that at least one of the plurality of alternative audio compositions used in at least one of the alternative video segments selected by the user from the list on the GUI is automatically applied to the selected video segment of the current video project.

2. The method of claim 1, further including:
analyzing each of the alternative video segments; and
deriving acoustic, linguistic, and visual characteristics from the alternative video segments.

3. The method of claim 1, further including creating the corpus describing the acoustic, linguistic, and visual characteristics derived from each the alternative video segments.

4. The method of claim 1, further including aggregating the one or more acoustic characteristics of those of the alternative video segments having a correlation score equal to or greater than a defined threshold.

5. A system for implementing intelligent audio composition guidance for a video, comprising:
one or more computers with executable instructions that when executed cause the system to:
receive, as input from a user through a user interface, a video associated with a current video project;
segment the video into video segments and identifying a selected video segment for which an audio composition is to be generated for;
input only the selected video segment of the video for which the audio composition is to be generated for into a search query;
analyze the selected video segment to produce search query metadata;
generate, using a visual composition analysis of visual data of the selected video segment based on the search query metadata, the search query as a search for an audio analysis of audio data of alternative video segments stored in a corpus based on the visual composition analysis of the visual data;
responsive to receiving the selected video segment and the search query metadata as input into the search query, identify, from the corpus, one or more acoustic characteristics used in the alternative video segments having similar acoustic, linguistic, and visual characteristics of the selected video segment according to a comparison of the selected video segment and the alternative video segments, wherein the similar acoustics, linguistic, and visual characteristics of the selected video segment are determined by performing an artificial intelligence (AI) analysis to derive a topic, tone, and emotional components related to a context of the selected video segment, including indications of characteristics associated with those of the alternative video segments used during a particular historical time period, used to match a similar context of the alternative video segments to identify the one or more acoustic characteristics related thereto notwithstanding whether the similar acoustic, linguistic, and visual characteristics of the selected video segment and the alternative video segments are identical;
assign a correlation score to each of the alternative video segments according to a degree of similarity to the acoustic, linguistic, and visual characteristics of the selected video segment;
output an indication of the identified one or more acoustic characteristics determined from the comparison via the user interface selectively used in adding the audio composition to the selected video segment, wherein the indication is inclusive of a plurality of alternative audio compositions respectively used in the alternative video segments to which the identified one or more acoustic characteristics correspond;
in conjunction with outputting the indication, display those of the alternative video segments having the correlation score over a predefined threshold on an interactive graphical user interface (GUI) and listed with the correlation score, wherein the user selects through the plurality of the alternative video segments listed on the GUI to selectively view only those specific portions of the alternative video segments respectively associated with those of the plurality of alternative audio compositions identified by the search query; and
generate the audio composition for the selected video segment using the indicated identified one or more acoustic characteristics, wherein generating the audio composition includes automatically associating the identified one or more acoustic characteristics, output as a result of the search query, with the selected video segment such that at least one of the plurality of alternative audio compositions used in at least one of the alternative video segments selected by the user from the list on the GUI is automatically applied to the selected video segment of the current video project.

6. The system of claim 5, wherein the executable instructions:
analyze each of the alternative video segments; and
derive acoustic, linguistic, and visual characteristics from the alternative video segments.

7. The system of claim 5, wherein the executable instructions create the corpus describing the acoustic, linguistic, and visual characteristics derived from each the alternative video segments.

8. The system of claim 5, wherein the executable instructions aggregate the one or more acoustic characteristics of those of the alternative video segments having a correlation score equal to or greater than a defined threshold.

9. A computer program product for, by a processor, implementing intelligent audio composition guidance for a video, the computer program product comprising a non-transitory computer-readable storage medium having computer-readable program code portions stored therein, the computer-readable program code portions comprising:
an executable portion that receives, as input from a user through a user interface, a video associated with a current video project;
an executable portion that segments the video into video segments and identifying a selected video segment for which an audio composition is to be generated for;
an executable portion that inputs only the selected video segment of the video for which the audio composition is to be generated for into a search query;
an executable portion that analyzes the selected video segment to produce search query metadata;
an executable portion that generates, using a visual composition analysis of visual data of the selected video segment based on the search query metadata, the search query as a search for an audio analysis of audio data of alternative video segments stored in a corpus based on the visual composition analysis of the visual data;

an executable portion that, responsive to receiving the selected video segment and the search query metadata as input into the search query, identifies, from the corpus, one or more acoustic characteristics used in the alternative video segments having similar acoustic, linguistic, and visual characteristics of the selected video segment according to a comparison of the selected video segment and the alternative video segments, wherein the similar acoustics, linguistic, and visual characteristics of the selected video segment are determined by performing an artificial intelligence (AI) analysis to derive a topic, tone, and emotional components related to a context of the selected video segment, including indications of characteristics associated with those of the alternative video segments used during a particular historical time period, used to match a similar context of the alternative video segments to identify the one or more acoustic characteristics related thereto notwithstanding whether the similar acoustic, linguistic, and visual characteristics of the selected video segment and the alternative video segments are identical;

an executable portion that assigns a correlation score to each of the alternative video segments according to a degree of similarity to the acoustic, linguistic, and visual characteristics of the selected video segment;

an executable portion that outputs an indication of the identified one or more acoustic characteristics determined from the comparison via the user interface selectively used in adding the audio composition to the selected video segment, wherein the indication is inclusive of a plurality of alternative audio compositions respectively used in the alternative video segments to which the identified one or more acoustic characteristics correspond;

an executable portion that, in conjunction with outputting the indication, displays those of the alternative video segments having the correlation score over a predefined threshold on an interactive graphical user interface (GUI) and listed with the correlation score, wherein the user selects through the plurality of the alternative video segments listed on the GUI to selectively view only those specific portions of the alternative video segments respectively associated with those of the plurality of alternative audio compositions identified by the search query; and an executable portion that generates the audio composition for the selected video segment using the indicated identified one or more acoustic characteristics, wherein generating the audio composition includes automatically associating the identified one or more acoustic characteristics, output as a result of the search query, with the selected video segment such that at least one of the plurality of alternative audio compositions used in at least one of the alternative video segments selected by the user from the list on the GUI is automatically applied to the selected video segment of the current video project.

10. The computer program product of claim 9, further including an executable portion that:

analyze each of the alternative video segments; and derive acoustic, linguistic, and visual characteristics from the alternative video segments.

11. The computer program product of claim 9, further including an executable portion that create the corpus describing the acoustic, linguistic, and visual characteristics derived from each the alternative video segments.

12. The computer program product of claim 9, further including an executable portion that aggregates the one or more acoustic characteristics of those of the alternative video segments having a correlation score equal to or greater than a defined threshold.

* * * * *